(12) United States Patent
Sawa et al.

(10) Patent No.: US 8,067,322 B2
(45) Date of Patent: *Nov. 29, 2011

(54) GLASS COMPOSITION FOR LAMP, GLASS PART FOR LAMP, AND PROCESS FOR PRODUCING LAMP OR GLASS COMPOSITION FOR LAMP

(75) Inventors: Ryousuke Sawa, Osaka (JP); Junko Abe, Osaka (JP); Tomoko Atagi, Osaka (JP); Masanobu Itou, Hyogo (JP); Tomoko Akai, Hyogo (JP); Masaru Yamashita, Osaka (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 790 days.

This patent is subject to a terminal disclaimer.

(21) Appl. No.: 11/993,004

(22) PCT Filed: Jul. 7, 2006

(86) PCT No.: PCT/JP2006/313540
§ 371 (c)(1),
(2), (4) Date: Dec. 18, 2007

(87) PCT Pub. No.: WO2007/007651
PCT Pub. Date: Jan. 18, 2007

(65) Prior Publication Data
US 2010/0216624 A1 Aug. 26, 2010

(30) Foreign Application Priority Data

Jul. 12, 2005 (JP) ................................. 2005-203574

(51) Int. Cl.
C03C 3/095 (2006.01)
C03C 3/087 (2006.01)
H01J 17/16 (2006.01)

(52) U.S. Cl. ............ 501/64; 501/70; 313/480; 313/493; 313/495; 313/636

(58) Field of Classification Search .................... 501/64, 501/70; 313/480, 493, 495, 636
See application file for complete search history.

(56) References Cited

U.S. PATENT DOCUMENTS

| | | | | |
|---|---|---|---|---|
| 4,562,161 A * | 12/1985 | Mennemann et al. | .......... | 501/59 |
| 5,350,972 A | 9/1994 | Bucher et al. | | |
| 5,958,811 A * | 9/1999 | Sakaguchi et al. | .............. | 501/71 |
| 7,026,753 B2 | 4/2006 | Futagami et al. | | |
| 7,795,798 B2 * | 9/2010 | Akai et al. | .................... | 313/503 |
| 2002/0074930 A1 | 6/2002 | Futagami | | |
| 2003/0114291 A1 * | 6/2003 | Koyama et al. | ................. | 501/64 |
| 2009/0231830 A1 * | 9/2009 | Akai et al. | ..................... | 362/84 |
| 2010/0041540 A1 * | 2/2010 | Toda et al. | ..................... | 501/70 |

FOREIGN PATENT DOCUMENTS

| | | | |
|---|---|---|---|
| EP | 834481 A1 * | 4/1998 | |
| JP | 55007510 A * | 1/1980 | |
| JP | 4-46031 | 2/1992 | |
| JP | 4-270138 | 9/1992 | |
| JP | 6-345479 | 12/1994 | |
| JP | 2532045 | 6/1996 | |
| JP | 10072239 A * | 3/1998 | |
| JP | 10152342 A * | 6/1998 | |
| JP | 2002-137935 | 5/2002 | |
| JP | 2003-171142 | 6/2003 | |

OTHER PUBLICATIONS

Chinese Office Action re App No. 200680025763.5, May 6, 2010, 2 pages.

* cited by examiner

Primary Examiner — Karl Group
Assistant Examiner — Elizabeth A Bolden

(57) ABSTRACT

A glass composition for lamps includes the following by weight percent: $SiO_2$: 60-75 wt %; $CeO_2+Ce_2O_3$: 0.01-5.2 wt %; $SnO+SnO_2$: 0.01-5.2 wt %; $Al_2O_3$: 0.5-6 wt %; $B_2O_3$: 0-5 wt %; $Li_2O+Na_2O+K_2O$: 13-20 wt %; MgO: 0.5-5 wt %; CaO: 1-10 wt %; SrO: 0-10 wt %; BaO: 0-10 wt %; ZnO: 0-10 wt %; $Fe_2O_3+FeO$: 0-0.2 wt %; and $TiO_2$: 0-1 wt %. The glass composition for lamps that contains no lead or antimony achieves high ultraviolet screening capacity, ensuring fewer occurrences of initial coloring and ultraviolet ray caused coloring of glass.

8 Claims, 9 Drawing Sheets

FIG.1

| | | EXAMPLE | | | | | | | | | | | | | | | | |
|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 |
| GLASS COMPOSI-TION | SiO2 | 70.45 | 70.77 | 70.65 | 70.54 | 71.02 | 68.03 | 68.08 | 66.08 | 69.98 | 69.99 | 70.05 | 73.06 | 73.24 | 73.35 | 70.00 | 71.00 | 68.70 |
| | Al2O3 | 2.0 | 3.0 | 2.0 | 3.0 | 1.5 | 1.5 | 2.0 | 0.5 | 2.5 | 0.8 | 1.8 | 2.5 | 2.0 | 1.0 | 3.0 | 1.0 | 2.0 |
| | B2O3 | – | 1.0 | 1.0 | 1.0 | – | – | 1.5 | 2.0 | 1.0 | 1.0 | – | 1.0 | – | 1.2 | – | 1.5 | – |
| | Li2O | 2.0 | 1.5 | 1.3 | 3.0 | 2.0 | 4.0 | 3.5 | 5.5 | 0.9 | – | – | – | – | – | 0.05 | 0.05 | – |
| | Na2O | 9.0 | 7.5 | 8.0 | 6.0 | 7.0 | 8.0 | 7.5 | 6.5 | 16 | 15 | 16 | 16 | 14 | 15 | 15 | 14 | 14 |
| | K2O | 4.0 | 6.0 | 5.7 | 6.0 | 6.4 | 3.8 | 4.5 | 5.0 | – | 4.0 | 1.3 | 2.0 | 3.1 | 1.5 | 2.0 | 3.0 | 2.0 |
| | MgO | 1.0 | 2.0 | 1.0 | 1.5 | 1.0 | 1.0 | 0.5 | 1.0 | 2.5 | 3.0 | 3.8 | 2.0 | 3.2 | 2.6 | 2.0 | 1.0 | 1.0 |
| | CaO | 3.5 | 3.0 | 4.0 | 2.0 | 3.5 | 4.0 | 4.0 | 2.0 | 4.0 | 3.0 | 5.9 | 3.0 | 4.0 | 4.3 | 5.8 | 2.0 | 2.0 |
| | SrO | 4.0 | – | – | – | 3.0 | 3.0 | – | 0.5 | – | 2.0 | – | – | – | – | – | – | – |
| | BaO | 4.0 | 2.0 | 3.0 | 2.0 | 0.5 | – | 2.0 | 0.5 | 3.0 | 1.0 | – | – | – | – | – | – | – |
| | ZnO | – | 3.0 | 3.0 | 4.5 | 3.0 | 4.5 | – | – | – | – | – | – | – | – | – | – | – |
| | Sb2O3 | – | – | – | – | – | – | – | – | – | – | – | – | – | – | – | – | – |
| | Fe2O3 | 0.03 | 0.02 | 0.02 | 0.02 | 0.02 | 0.02 | 0.02 | 0.02 | 0.1 | 0.10 | 0.05 | 0.1 | – | – | – | 0.05 | – |
| | TiO2 | – | – | – | – | – | 0.05 | – | – | – | – | – | – | – | – | 0.05 | – | – |
| | CeO2+Ce2O3 | 0.01 | 0.10 | 0.16 | 0.21 | 0.52 | 1.0 | 3.0 | 5.2 | 0.01 | 0.10 | 1.0 | 0.16 | 0.22 | 0.51 | 1.0 | 3.0 | 5.1 |
| | SnO+SnO2 | 0.01 | 0.11 | 0.17 | 0.23 | 0.54 | 1.1 | 3.4 | 5.2 | 0.01 | 0.11 | 1.0 | 0.18 | 0.24 | 0.54 | 1.1 | 3.4 | 5.2 |
| THERMAL EXPANSION COEF. | | 94 | 96 | 95 | 94 | 93 | 94 | 92 | 93 | 99 | 102 | 99 | 99 | 100 | 99 | 99 | 98 | 98 |
| SOFTENING POINT | | 665 | 675 | 676 | 680 | 682 | 670 | 680 | 685 | 688 | 695 | 690 | 692 | 694 | 692 | 690 | 700 | 700 |
| ELECT. VOL. REGISTIVITY LOG ρ | | 8.6 | 8.5 | 8.6 | 8.5 | 8.5 | 8.6 | 8.5 | 8.7 | 6.4 | 6.3 | 6.4 | 6.3 | 6.4 | 6.3 | 6.4 | 6.3 | 6.5 |
| 313 NM UV TRANSMITTANCE | | 9 | 6 | 2 | 0 | 0 | 0 | 0 | 0 | 9 | 6 | 5 | 2 | 0 | 0 | 0 | 0 | 0 |
| INITIAL COLORINIG | | ○ | ○ | ○ | ○ | ○ | ○ | ○ | ○ | ○ | ○ | ○ | ○ | ○ | ○ | ○ | ○ | ○ |
| UV COLORING | | ○ | ○ | ○ | ○ | ○ | ○ | ○ | ○ | ○ | ○ | ○ | ○ | ○ | ○ | ○ | ○ | ○ |
| DISCOLORMENT/DETERIORATION | | ○ | ○ | ○ | ○ | ○ | ○ | ○ | ○ | ○ | ○ | ○ | ○ | ○ | ○ | ○ | ○ | ○ |
| LUMINOUS FLUX (100 HR) | | 2450 | 2458 | 2460 | 2463 | 2465 | 2468 | 2472 | 2482 | 1810 | 1818 | 1826 | 1819 | 1821 | 1824 | 1827 | 1832 | 1846 |
| LUMINOUS FLUX (2000 HR) | | 1950 | 1955 | 1957 | 1959 | 1961 | 1962 | 1967 | 1977 | 1540 | 1545 | 1552 | 1546 | 1547 | 1549 | 1555 | 1557 | 1574 |
| LUMEN MAINTENANCE FACTOR | | 80 | 80 | 80 | 80 | 80 | 79 | 80 | 80 | 85 | 85 | 85 | 85 | 85 | 85 | 85 | 85 | 85 |

|  |  | COMPARATIVE EXAMPLE | | | | | | | | | |
|---|---|---|---|---|---|---|---|---|---|---|---|
|  |  | 18 | 19 | 20 | 21 | 22 | 23 | 24 | 25 | 26 | 27 |
| GLASS COMPOSI-TION | SiO2 | 69.96 | 69.88 | 70.42 | 63.78 | 70.85 | 71.99 | 72.00 | 71.00 | 67.60 | 72.35 |
|  | Al2O3 | 2.0 | 3.0 | 2.0 | 2.0 | 1.8 | 0.5 | 1.5 | 2.5 | 1.5 | 1.7 |
|  | B2O3 | 1.0 | 0.5 | — | 1.0 | 1.5 | — | 1.0 | 1.9 | — | — |
|  | Li2O | 3.0 | 3.5 | 2.0 | 4.5 | 1.4 | — | — | 0.05 | — | — |
|  | Na2O | 9.5 | 8.0 | 8.5 | 7.0 | 8.5 | 15 | 16 | 13 | 13 | 16 |
|  | K2O | 3.5 | 5.0 | 5.5 | 4.0 | 4.7 | 3.5 | 1.6 | 5.0 | 2.0 | 1.1 |
|  | MgO | 1.0 | 3.0 | 0.5 | 1.0 | 1.0 | 4.0 | 1.0 | 1.5 | 1.0 | 2.7 |
|  | CaO | 3.0 | 2.0 | 6.0 | 1.5 | 1.9 | 5.0 | 5.0 | 4.0 | 2.5 | 5.6 |
|  | SrO | 4.0 | 2.0 | 2.0 | 0.5 | 5.3 | — | — | — | — | — |
|  | BaO | 2.0 | 1.0 | 2.0 | 0.5 | 2.5 | — | 1.8 | — | — | — |
|  | ZnO | 1.0 | 2.0 | — | 2.0 | — | — | — | — | — | 0.5 |
|  | Sb2O3 | 0.03 | 0.02 | 0.03 | 0.02 | 0.5 | — | — | — | — | 0.05 |
|  | Fe2O3 | — | — | 0.05 | — | 0.05 | — | — | 0.05 | — | — |
|  | TiO2 | 0.005 | 0.10 | 1.0 | 6.1 | 0 | 0.005 | 0.10 | 1.0 | 6.2 | 0 |
|  | CeO2+Ce2O3 | — | — | — | — | — | — | — | — | — | — |
|  | SnO+SnO2 | 0.005 | 0 | 0 | 6.1 | 0 | 0.005 | 0 | 0 | 6.2 | 0 |
| THERMAL EXPANSION COEF. | | 94 | 96 | 93 | 92 | 95 | 101 | 102 | 101 | 97 | 99 |
| SOFTENING POINT | | 670 | 670 | 675 | 690 | 670 | 688 | 695 | 690 | 700 | 700 |
| ELECT. VOL. REGISTIVITY LOG ρ | | 8.5 | 8.5 | 8.6 | 8.7 | 8.5 | 6.3 | 6.3 | 6.4 | 6.5 | 6.3 |
| 313 NM UV TRANSMITTANCE | | 23 | 0 | 0 | 0 | 22 | 24 | 0 | 0 | 0 | 22 |
| INITIAL COLORING | | ○ | ○ | ○ | × | ○ | ○ | ○ | ○ | × | ○ |
| UV COLORING | | ○ | × | × | × | × | × | × | × | × | ○ |
| DISCOLORMENT/DETERIORATION | | × | ○ | ○ | ○ | ○ | ○ | ○ | ○ | ○ | × |
| LUMINOUS FLUX (100 HR) | | 2389 | 2340 | 2338 | 2413 | 2400 | 1790 | 1750 | 1740 | 1810 | 1800 |
| LUMINOUS FLUX (2000 HR) | | 1908 | 1829 | 1805 | 1830 | 1920 | 1530 | 1450 | 1425 | 1440 | 1530 |
| LUMEN MAINTENANCE FACTOR | | 80 | 78 | 77 | 76 | 80 | 85 | 83 | 82 | 80 | 85 |

| | | EXAMPLE | | | | COMPARATIVE EXAMPLE | | | |
|---|---|---|---|---|---|---|---|---|---|
| | | 31 | 32 | 33 | 34 | 35 | 36 | 37 | 38 |
| GLASS COMPOSI-TION | $SiO_2$ | 67.78 | 67.63 | 66.70 | 67.81 | 67.63 | 67.78 | 67.65 | 72.75 |
| | $Al_2O_3$ | 3.0 | 2.0 | 3.0 | 3.0 | 3.0 | 3.0 | 2.0 | 1.7 |
| | $B_2O_3$ | – | – | 1.0 | – | – | – | 1.0 | 0.9 |
| | $Li_2O+Na_2O+K_2O$ | 13.9 | 14.5 | 13.9 | 14.3 | 14.5 | 14.9 | 14.5 | 17.5 |
| | MgO | 1.2 | 1.2 | 1.2 | 1.2 | 1.2 | 1.2 | 1.0 | 2.0 |
| | CaO | 2.0 | 3.0 | 2.0 | 2.0 | 3.0 | 2.0 | 2.5 | 4.5 |
| | SrO | 2.8 | 5.0 | 2.8 | 2.8 | 5.0 | 2.8 | 5.0 | – |
| | BaO | 8.2 | 5.4 | 8.2 | 7.8 | 5.4 | 8.2 | 5.4 | 0.1 |
| | $Sb_2O_3$ | – | – | – | – | – | – | – | 0.5 |
| | $Fe_2O_3+FeO$ | 0.04 | 0.07 | 0.1 | 0.04 | 0.07 | 0.07 | 0.04 | 0.05 |
| | $CeO_2+Ce_2O_3$ | 0.08 | 0.2 | 0.3 | 0.05 | 0.2 | 0.05 | 0.4 | – |
| | $SnO+SnO_2$ | 1.0 | 1.0 | 0.5 | 1.0 | – | – | 0.01 | – |
| | $SO_3$ | – | – | 0.3 | – | – | – | 0.5 | – |
| $Fe^{3+}/T-Fe$ | | 0.4 | 0.46 | 0.49 | 0.4 | 0.53 | 0.55 | 0.4 | 0.6 |
| THERMAL EXPANSION COEF. | | 94 | 94 | 94 | 95 | 95 | 94 | 96 | 99 |
| UV COLORING | | ○ | ○ | ○ | ○ | ○ | ○ | × | ○ |
| DISCOLORMENT/DETERIORATION | | ○ | ○ | ○ | △ | ○ | △ | ○ | × |
| LUMINOUS FLUX (100 HR) | | 2480 | 2450 | 2440 | 2400 | 2370 | 2390 | 2380 | 2400 |
| LUMINOUS FLUX (2000 HR) | | 2010 | 2000 | 1960 | 1920 | 1900 | 1900 | 1785 | 1680 |
| LUMEN MAINTENANCE FACTOR | | 81 | 82 | 80 | 80 | 80 | 79 | 75 | 70 |

GLASS COMPOSITION FOR LAMP, GLASS PART FOR LAMP, AND PROCESS FOR PRODUCING LAMP OR GLASS COMPOSITION FOR LAMP

TECHNICAL FIELD

The present invention relates to a glass composition for lamps, a glass part for lamps, a lamp and a process for producing glass composition for lamps.

BACKGROUND ART

A fluorescent lamp, which is a common type of all lamps, has a mechanism as follows. A fluorescent lamp is provided with an arc tube having a phosphor layer on the inner surface thereof. Mercury and noble gas fill the arc tube. Ultraviolet rays are produced inside the arc tube by mercury excitation when an electric discharge occurs. The ultraviolet rays are converted into visible light by the phosphor layer. As a result, the fluorescent lamp emits light. Conventional glass for such a fluorescent lamp is made of lead glass that contains 4-28 wt % of lead oxide. Today, however, soda-lime glass that does not contain lead oxide is replacing the lead glass for environmental conservation.

When ultraviolet rays penetrate the phosphor layer and the arc tube and leak out of the lamp, discolorment and the mechanical strength deterioration of resin components of luminaire and such as well as lighted objects may occur. Such discolorment and deterioration matter especially when using a fluorescent lamp for display lighting of clothes and art objects. Unfortunately, however, a conventional fluorescent lamp does not sufficiently cut ultraviolet rays (especially ultraviolet rays with a wavelength of 313 nm) generated by mercury excitation. Consequently, the resin components that are susceptible to ultraviolet rays often undergo a problem of discolorment and deterioration.

In view of the above problem, Patent Documents 1 and 2 listed below disclose that glass for lamps containing $CeO_2$ improves the ultraviolet screening capacity. Patent Document 1 also discloses the use of glass containing $Sb_2O_3$ used for an arc tube provides a fluorescent lamp that is able to maintain high luminance.

PATENT DOCUMENT 1: Japanese Patent Application Publication No. 2002-137935
PATENT DOCUMENT 2: Japanese Patent No. 2532045

DISCLOSURE OF THE INVENTION

Problems the Invention is Attempting to Solve

Unfortunately, however, glass containing $CeO_2$ can cause undesirable glass coloring during production of glass (hereinafter called initial coloring) or solarization (hereinafter called ultraviolet coloring). As a result, transmittance of visible light of an arc tube is lowered, which reduces luminous flux of a lamp.

Use of $Sb_2O_3$ is also unfavorable from the viewpoint of environmental protection. Besides, glass containing $Sb_2O_3$ has high transmittance of ultraviolet rays with a wavelength of 313 nm. Moreover, when glass contains both $CeO_2$ and $Sb_2O_3$, ultraviolet coloring is more likely to occur.

An object of the present invention is to provide a glass composition for lamps, a glass part for lamps, and a lamp each of which contains no lead or antimony, offers high ultraviolet screening capacity, and causes neither initial coloring nor ultraviolet coloring on glass. Another object of the present invention is to provide a process for producing the glass composition for lamps.

Means for Solving the Problems

The inventors of the present invention have supposed that the higher a concentration of $CeO_2$ contained in glass is, the higher a probability is that the glass containing $CeO_2$ is colored by ultraviolet rays. After considerable study, the inventors have found that the presence of SnO in glass is effective for reducing the $CeO_2$ to $Ce_2O_3$. The inventors have also discovered that the glass composition of the present invention emits white light when exposed to ultraviolet radiation with a wavelength of 254 nm, which is a favorable characteristic for a fluorescent lamp.

More specifically, the glass composition for lamps, substantially includes the following that are expressed in terms of oxides: $SiO_2$: 60-75 wt %; $CeO_2+Ce_2O_3$: 0.01-5.2 wt %; $SnO+SnO_2$: 0.01-5.2 wt %; $Al_2O_3$: 0.5-6 wt %; $B_2O_3$: 0-5 wt %; $Li_2O+Na_2O+K_2O$: 13-20 wt %; MgO: 0.5-5 wt %; CaO: 1-10 wt %; SrO: 0-10 wt %; BaO: 0-10 wt %; ZnO: 0-10 wt %; $Fe_2O_3+FeO$: 0-0.2 wt %; and $TiO_2$: 0-1 wt %.

In accordance with a specific aspect of the present invention, the glass composition for lamps of the present invention emits white light when exposed to ultraviolet radiation with a wavelength of 254 nm.

In accordance with a specific aspect of the present invention, a weight percent of the $CeO_2+Ce_2O_3$ ranges between 0.08 and 0.3 wt % inclusive, and a weight percent of the $Fe_2O_3+FeO$ ranges between 0.4 and 0.1 wt % inclusive.

In accordance with a specific aspect of the present invention, a weight percent of the $CeO_2+Ce_2O_3$ is lower than a weight percent of the $SnO+SnO_2$.

In accordance with a specific aspect of the glass composition for lamps of the present invention, a thermal expansion coefficient ($\alpha_{300/380}$) of the glass composition ranges between $90 \times 10^{-7}$ and $104 \times 10^{-7}$/K inclusive.

A glass part for lamps according to another aspect of the present invention includes the glass composition.

A lamp according to yet another aspect of the present invention includes the glass part for lamps.

According to yet another aspect of the present invention, a process for producing a glass composition for lamps of the present invention includes: preparing glass materials substantially containing the following that are expressed in terms of oxides: $SiO_2$: 60-75 wt %; $CeO_2+Ce_2O_3$: 0.01-5.2 wt %; $SnO+SnO_2$: 0.01-5.2 wt %; $Al_2O_3$: 0.5-6 wt %; $B_2O_3$: 0-5 wt %; $Li_2O+Na_2O+K_2O$: 13-20 wt %; MgO: 0.5-5 wt %; CaO: 1-10 wt %; SrO: 0-10 wt %; BaO: 0-10 wt %; ZnO: 0-10 wt %; $Fe_2O_3+FeO$: 0-0.2 wt %; and $TiO_2$: 0-1 wt %; and melting the glass materials. The glass materials in a molten state are made to have reductive properties.

Effects of the Invention

A glass composition for lamps of the present invention contains 0.01-5.2 wt % of $CeO_2+Ce_2O_3$ and 0.01-5.2 wt % of $SnO+SnO_2$ both of which are expressed in terms of oxides. Thus, the glass composition of the present invention is able to sufficiently screen ultraviolet rays and also suppress initial coloring and ultraviolet coloring of glass. More specifically, a $CeO_2+Ce_2O_3$ content of 0.01 wt % and more in glass suppresses ultraviolet ray transmission, and an $SnO+SnO_2$ content of 0.01 wt % and more suppresses initial coloring and ultraviolet coloring. Thus, use of the glass composition for lamps of the present invention provides a fluorescent lamp having a high luminous flux and a high lumen maintenance factor.

After considerable study, the inventors have ascertained that the cause of glass coloring is an increase in a $Ce^{4+}$ content in the glass as a result of $CeO_2$ addition. The investors have further discovered that the presence of SnO in glass components serves to reduce the $Ce^{4+}$ and thereby preventing glass coloring. Note that glass coloring caused by $CeO_2$ can be prevented only when SnO exists as Sn component in a glass composition; a mere presence of Sn and/or $SnO_2$ in the glass composition fails to achieve the above effect. This is because an SnO content causes an increase in $Ce^{3+}$ and a decrease in $Ce^{4+}$. More specifically, SnO suppresses a valence change from $Ce^{3+}$ into $Ce^{4+}$ and stimulates a valence change from $Ce^{4+}$ into $Ce^{3+}$.

In recent years, when there has been increasing demand for energy-saving and resource-saving light sources, an arc tube of a fluorescent lamp has become diametrically narrower for high efficiency and downsizing of the fluorescent lamp. Consequently, a compact fluorescent lamp that includes an arc tube of a complicated shape such as a narrow tube that is bent or connected to another tube has been developed. Unfortunately, however, such a compact fluorescent lamp easily permits ultraviolet rays to leak out of an arc tube. Thus, the glass composition of the present invention is particularly effective. In addition, soda-lime glass is generally more apt to permit ultraviolet rays to leak out of an arc tube than lead glass does. Thus, the glass composition of the present invention is certainly effective.

The glass composition of the present invention emits white light when exposed to ultraviolet radiation with a wavelength of 254 nm. Thus, use of the glass composition for lamps of the present invention makes it possible to provide a lamp having a higher luminous flux.

The glass composition according to the present invention is even more preferable when the $CeO_2+Ce_2O_3$ content in glass is specified 0.08-0.3 wt % and the $Fe_2O_3+FeO$ content is specified to fall within the range of 0.04-0.1 wt %, and besides when a ratio of trivalent ferric ions to all iron ions contained in the glass: (trivalent ferric ions)/(all iron ions) is specified to be less than 0.5. This arrangement more reliably suppresses occurrence of initial coloring or ultraviolet coloring, and provides glass having high visible light transmittance at a relatively low cost. The following is the reason for the advantageous effect noted above.

A fair amount of $Fe_2O_3$ is contained as impurities in silica sand, one of popular raw materials of soda-lime glass. In addition to the silica sand, other raw materials of glass commonly include $Fe_2O_3$. Accordingly, it is difficult to produce soda-lime glass that is free of $Fe_2O_3$. Producing soda-lime glass that contains no $Fe_2O_3$ requires specially-refined silica sand and the like, which results in higher cost of raw materials.

$Fe_2O_3$ exists in a state of bivalent iron ions ($Fe^{2+}$) or trivalent iron ions ($Fe^{3+}$) in glass. The bivalent iron ions absorb infrared rays with a wavelength of 1100 nm. The trivalent iron ions absorb ultraviolet rays with a wavelength of mainly 380 nm. The bivalent iron ions absorb little visible light, which rarely causes glass to be colored. The trivalent ferric ions, however, absorb short-wavelength visible light, which causes glass to be colored pale green.

The inventors have found that initial coloring caused by $Fe_2O_3$ can be prevented under the following condition. For glass containing 0.08-0.3 wt % of $CeO_2+Ce_2O_3$ and 0.04-0.1 wt % of $Fe_2O_3+FeO$, a ratio of trivalent ferric ions to all iron ions contained in the glass is set to fall below 0.5. This finding makes it possible to add a larger amount of $Fe_2O_3$ while initial coloring is prevented. In sum, even when $CeO_2$ alone contained in glass fails to cut sufficient ultraviolet rays, adding $Fe_2O_3$ to the glass composition improves an ultraviolet screening effect.

A comparison of ultraviolet ray absorption properties of trivalent iron ions and $CeO_2$ is made. With an object of absorbing a mercury emission line with a wavelength of 313 nm, $CeO_2$ that does not absorb short-wavelength visible light is more advantageous. Unfortunately, however, there is a case when sufficient amount of $CeO_2$ cannot be added because the $CeO_2$ causes ultraviolet coloring. In such a case, it is especially effective to use an iron oxide further to achieve ultraviolet screening effect.

Adding $Fe_2O_3$ instead of $CeO_2$ can reduce raw material cost while ensuring the effectiveness of ultraviolet screening. $Fe_2O_3$ is less expensive than $CeO_2$.

According to the glass composition for lamps of the present invention, when the $CeO_2+Ce_2O_3$ content in glass is lower than the $SnO+SnO_2$ content, an increase in $Ce^{3+}$ and a decrease in $Ce^{4+}$ are more likely to occur. Thus, the glass composition for lamps of the present invention more reliably suppresses ultraviolet coloring.

A thermal expansion coefficient ($\alpha_{30/380}$) of the glass composition of the present invention may fall within the range of $90\times10^{-7}$-$104\times10^{-7}$/K. In this case, a lamp having a stem made of the glass composition for lamps results in that a thermal expansion coefficient of the stem approximates that of the electrically conductive lead. As a result, airtightness of the lamp is enhanced. Thus, the glass composition for lamps of the present invention hardly causes a lamp operation failure.

By virtue of the glass composition, the glass part for lamps of the present invention is able to screen ultraviolet rays efficiently, and therefore is hardly colored.

The lamp of the present invention includes the glass part for lamps that is less susceptible to coloring. Thus, the lamp is able to emit white light in response to ultraviolet radiation with a wavelength of 254 nm generated by a discharge in the lamp, thereby providing a high luminous flux.

A process for producing the glass composition for lamps of the present invention includes a melting step in which the glass materials in a molten state are made to have reductive properties. Thus, the resultant glass composition more effectively prevents initial coloring and ultraviolet coloring of the glass composition that has the above luminous properties.

According to the present invention, the glass composition for lamps, the glass part for lamps, and the lamp do not contain any environmental-load substances such as lead or $Sb_2O_3$ that are conventionally used to improve the properties of soda-lime glass. Thus, the present invention meets social needs of global environmental protection.

BRIEF DESCRIPTION OF THE DRAWINGS

FIG. 1 is a table in which compositions and properties of a glass composition are tabulated in accordance with examples of the present invention;

FIG. 2 is a table in which compositions and properties of the glass composition are tabulated in accordance with comparative examples;

FIG. 3 is a table in which glass compositions in accordance with examples and comparative examples of the present invention and compositions and properties of the glass compositions are tabulated in accordance with the comparative example;

Figure 4:
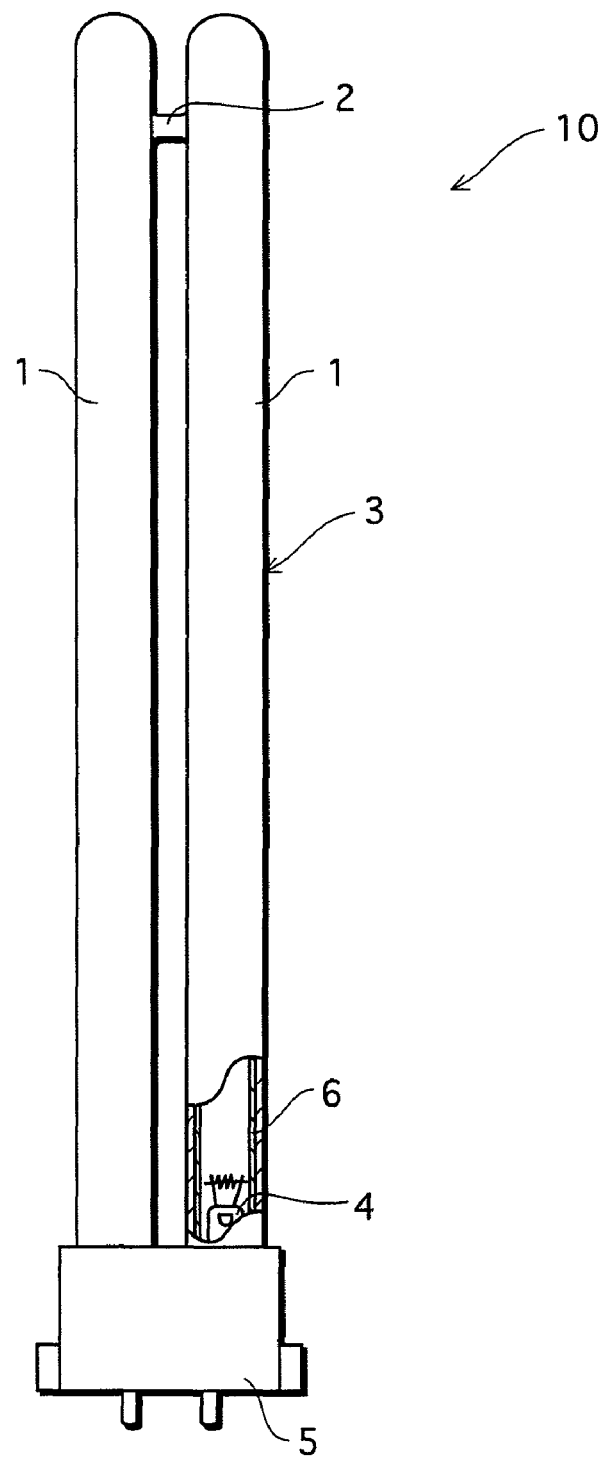
FIG. 4 is a schematic view showing a configuration of substantial parts of a fluorescent lamp in accordance with Embodiment 1 of the present invention.

REFERENCE NUMERALS 1, 22, 31 luminous tube (glass part)
32 stem (glass part)
10, 20, 30 lamp

BEST MODE FOR CARRYING OUT THE INVENTION

The following describes a glass composition for lamps, a glass part for lamps, a lamp, and a process for producing a glass composition for lamps that are in accordance with embodiments of the present invention, with reference to the attached drawings.

(Description of Glass Composition for Lamps)

The glass composition in accordance with the embodiments of the present invention contains substances expressed in terms of oxides shown in examples 1-17 in FIG. 1 and examples 31-34 in FIG. 3. Note that the glass composition (hereinafter called simply "glass") in accordance with the present invention is not limited to that of the examples 1-17 and the examples 31-34. However, for maintaining the favorable properties of the glass for lamps, it is preferable to substantially include the following expressed in terms of oxides: $SiO_2$: 60-75 wt %; $CeO_2+Ce_2O_3$: 0.01-5.2 wt %; $SnO+SnO_2$: 0.01-5.2 wt %; $Al_2O_3$: 0.5-6 wt %; $B_2O_3$: 0-5 wt %; $Li_2O+Na_2O+K_2O$: 13-20 wt %; MgO: 0.5-5 wt %; CaO: 1-10 wt %; SrO: 0-10 wt %; BaO: 0-10 wt %; ZnO: 0-10 wt %; $Fe_2O_3+FeO$: 0-0.2 wt %; and $TiO_2$: 0-1 wt %.

Hereinafter, the reasons for specifying each component of the glass as above are described.

$SiO_2$ is a main component of the glass skeleton. When an $SiO_2$ content is lower than 60 wt %, a thermal expansion coefficient of the glass increases so largely that the chemical strength degrades. When the $SiO_2$ content is higher than 75 wt %, the thermal expansion coefficient decreases so largely that the workability of the glass degrades.

$CeO_2$ is added to glass with an aim of lowering ultraviolet transmittance. It can be assumed that part of the $CeO_2$ may change into $Ce_2O_3$ when melted during production of the glass. Thus, the appropriate chemical formula for the $Ce_2O_3$. In addition, when a $CeO_2+Ce_2O_3$ content in glass of the present invention is lower than 0.01 wt %, ultraviolet transmittance cannot be lowered. When higher than 5.2 wt %, glass coloring occurs so that a fluorescent lamp that emits a desired luminous flux cannot be achieved.

SnO is added with an aim of stimulating a valence change in Ce. Similarly to the abovementioned $CeO_2$ case, however, part of the SnO may change into $SnO_2$ when melted during production. Thus, the appropriate chemical formula for the SnO component contained in finished glass is $SnO+SnO_2$. In addition, when an $SnO+SnO_2$ content is lower than 0.01 wt %, a valence change in Ce does not occur. When higher than 5.2 wt %, the mechanical strength of the glass deteriorates so that a problem occurs such as a low productivity in a tube drawing process.

Besides, it is desirable to contain SnO by equivalent mols or more to $CeO_2$.

SnO is a favorable Sn component of raw materials of the glass for lamps. However, $SnO_2$ may also be used as part of the raw materials, since SnO and $SnO_2$ coexist in glass even when SnO is solely used as a raw material as mentioned above.

A condition of the coexistence of SnO and $SnO_2$ is $0.01 \leq Sn^{2+}/(Sn^{2+}+Sn^{4+}) \leq 1.0$. More specifically, when $Sn^{2+}/(Sn^{2+}+Sn^{4+})=1.0$, glass coloring caused by ultraviolet rays is most efficiently prevented, since all Sn components are SnO. When $Sn^{2+}/(Sn^{2+}+Sn^{4+})<0.01$, ultraviolet coloring occurs and thus glass is colored, since a necessary amount of SnO to suppress ultraviolet coloring does not exist in the glass.

$Al_2O_3$ is a component to improve the weatherability and the devitrification resistance of glass. However, when a content of $Al_2O_3$ is lower than 0.5 wt %, such improvements cannot be achieved. On the other hand, the $Al_2O_3$ content higher than 6 wt % incurs a decrease in melting performance of glass. Therefore, the desirable range of $Al_2O_3$ content falls between 0.5 and 5 wt % inclusive.

$B_2O_3$ improves the strength and the durability of glass and also reduces the devitrification tendency. Therefore, a $B_2O_3$ content of 5 wt % or less in glass is desirable. Note that the $B_2O_3$ content of more than 5 wt % can result in that a thermal expansion coefficient of the glass falls too low.

$Li_2O$, $Na_2O$ and $K_2O$ that are alkali-metal oxides have functions of decreasing the glass viscosity and improving the fusibility and workability. When a content of the alkali metal oxides in glass is lower than 13 wt %, those functions are not sufficiently performed. Glass that contains more than 20 wt % of the alkali metal oxides is also inappropriate for a use of a fluorescent lamp for the following reason. A thermal expansion coefficient of the glass rises so high that the alakaline component easily elutes from the glass. The alikaline component reacted with the phosphor layer and mercury lowers the luminous flux of the fluorescent lamp.

MgO and CaO that are alkali-earth-metal oxides improve the chemical durability. When an MgO content is lower than 0.5 wt % or when a CaO content is lower than 1 wt %, the improvement cannot be expected. However, when the MgO content is higher than 5 wt % or when the CaO content is higher than 10 w %, there can be an increase in the devitrification tendency.

SrO and BaO are components to improve the fusibility of glass and the workability of a bulb during production of a fluorescent lamp. SrO and BaO also have an impact on improvement of the electrical resistivity, thereby providing glass with electrical insulation. The SrO and BaO contents each higher than 10 wt % cause an increase in the devitrification tendency. The desirable SrO content ranges between 0 and 8 wt % inclusive, and BaO between 0 and 10 wt % inclusive.

ZnO is added to lower a thermal expansion coefficient of glass and so as to increase the chemical durability. ZnO is also effective in moderating a transition of glass viscosity. When a ZnO content is higher than 10 wt %, the thermal expansion coefficient decreases too largely.

$Fe_2O_3$ is a component that is effective in absorbing ultraviolet rays. However, it may be assumed that part of $Fe_2O_3$ added as a raw material changes into FeO in a molten state during glass processing. Thus, the appropriate chemical formula for the $Fe_2O_3$ component contained in finished glass is $Fe_2O_3$+FeO.

Glass that contains more than 0.2 wt % of $Fe_2O_3$+FeO is undesirable for a fluorescent lamp for the following reason. Such glass is reduced in visible light transmittance, which leads to a lower luminous flux of a fluorescent lamp. An $Fe_2O_3$+FeO content ranging between 0.04 and 0.1 wt % inclusive is favorable for producing glass that is free from initial coloring and ultraviolet coloring at a relatively low cost. The preferable range of the $Fe_2O_3$+FeO content is between 0.04 and 0.07 wt % inclusive.

The favorable ratio of trivalent ferric ions to all iron ions contained in glass: (trivalent ferric ions)/(all iron ions) is under 0.5. When the ratio is 0.5 and over, the trivalent iron ions absorb light with a wavelength of mainly 380 nm and even absorb short-wavelength visible light. As a result, glass is colored green, which disables a lamp from having a high luminous flux. Thus, the favorable ratio is under 0.5.

$TiO_2$ is a component to suppress ultraviolet coloring but unfortunately lowers transmittance of visible light. Thus, a $TiO_2$ content is limited to 1 wt % or less.

Besides, it is preferable to limit content of impurities in the raw materials to be 0.01 wt % or less.

Furthermore, by limiting the contents of $Al_2O_3$, MgO and CaO, the essential components other than $SiO_2$, $CeO_2$+$Ce_2O_3$, $SnO$+$SnO_2$ and $Li_2O$+$Na_2O$+$K_2O$, as described in the opened claims, the glass composition of the present invention satisfies the required performance as glass for a fluorescent lamp. Used for an arc tube of a fluorescent lamp, the glass composition of the present invention ensures the adequate chemical strength of the glass, thereby preventing glass coloring and deterioration in a lifetime of the lamp. Thus, the glass composition maintains excellent performance of the lamp.

(Description of Process for Producing Glass Composition for Lamps)

The following is a description of a process for producing the glass composition of the present invention. First, a plurality of raw materials of glass are blended to prepare a glass composition within the range of the present invention. Second, the blended raw materials are put into a fusion furnace, melted at temperatures of 1500°-1600° C. so as to get vitrified, and thus glass melt is obtained. Third, the glass melt is formed into a tubular shape through a tube drawing process such as Danner Process, and is cut into a specified length. As a result, a glass tube for lamps is achieved. As glass parts for lamps, the glass tube is subject to heat processing to be formed into an arc tube and a stem. Various types of lamps are produced with use of such an arc tube and a stem.

SnO that is added as one of the raw materials of the glass serves as a reducing agent, therefore the glass melt comes to have reductive properties. SnO must be added to fall within the glass composition range of the present invention. Note that, however, $SnO_2$ may also be used as part of Sn component of the raw material.

In the reductive glass melt, $Ce^{4+}$ changes into $Ce^{3+}$, which means an increase in $Ce^{3+}$ content and a decrease in $Ce^{4+}$ content. A ferric ion of the iron oxide is maintained low in valence.

Note that the process for making reductive glass melt does not necessarily require the addition of SnO as a reducing agent. Other reducing agents such as carbon may be employed in the process. A clarifying agent that is sodium sulfate ($Na_2SO_4 \cdot 10H_2O$) may also be used as a reducing agent, though sodium sulfate is not so effective as SnO.

(Description of Lamp)

Firstly, a 27 watt compact fluorescent lamp (FPL27EX-N) is described as a lamp in accordance with Embodiment 1 of the present invention, with reference to the drawing. FIG. 4 is a partially broken perspective view showing a configuration of substantial parts of the 27 watt compact fluorescent lamp (FPL27EX-N) in accordance with Embodiment 1 of the present invention.

A compact fluorescent lamp 10 includes an arc tube 3 that is composed of two straight glass tubes 1. The arc tube 3 also includes a bridge 2 that connects first ends of each of the two straight glass tubes 1 so as to form a squared-U-shaped discharge path therethrough. A pair of electrodes 4 is fixed at the each end of the arc tube 3. A base 5 is fixed to the arc tube 3 so as to cover the both ends of the arc tube 3. A phosphor layer 6 including three band phosphors (e.g. $Y_2O_3$: $Eu^{3+}$, $LaPO_4$: Ce, Tb, $BaMgAl_{10}O_{17}$: Eu, Mn) is coated on the inner surface of the arc tube 3. A specified amount of mercury (unillustrated) and noble gas (unillustrated) such as argon fill the arc tube 3.

Figure 5:
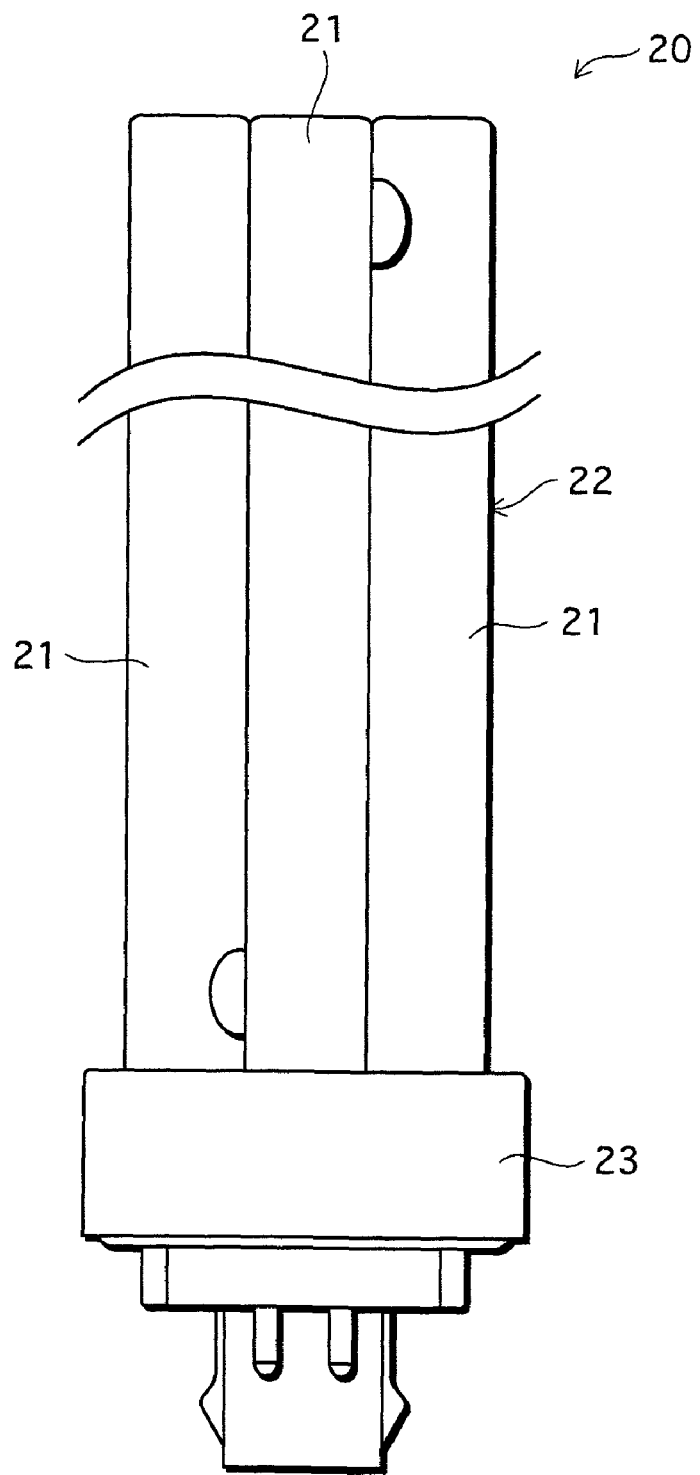
FIG. 5 is a schematic view showing a configuration of substantial parts of a fluorescent lamp in accordance with Embodiment 2 of the present invention.

Secondly, a 32 watt compact fluorescent lamp (FHT32EX-N) is described as a lamp in accordance with Embodiment 2 of the present invention, with reference to the drawing. FIG. 5 is a front view showing a configuration of substantial parts of the 32 watt compact fluorescent lamp (FHT32EX-N) in accordance with Embodiment 2 of the present invention.

A compact fluorescent lamp 20 is a multi-tube type compact fluorescent lamp (FHT). The compact fluorescent lamp 20 includes an arc tube 22 that is composed of six glass tubes 21 that are bridge-connected to one another, and a base 23 that is fixed to the arc tube 22. A phosphor layer including three band phosphors (color temperature of 5000K) is coated on the inner surface of the arc tube 22. A specified amount of mercury and noble gas fill the arc tube 22.

Figure 6:
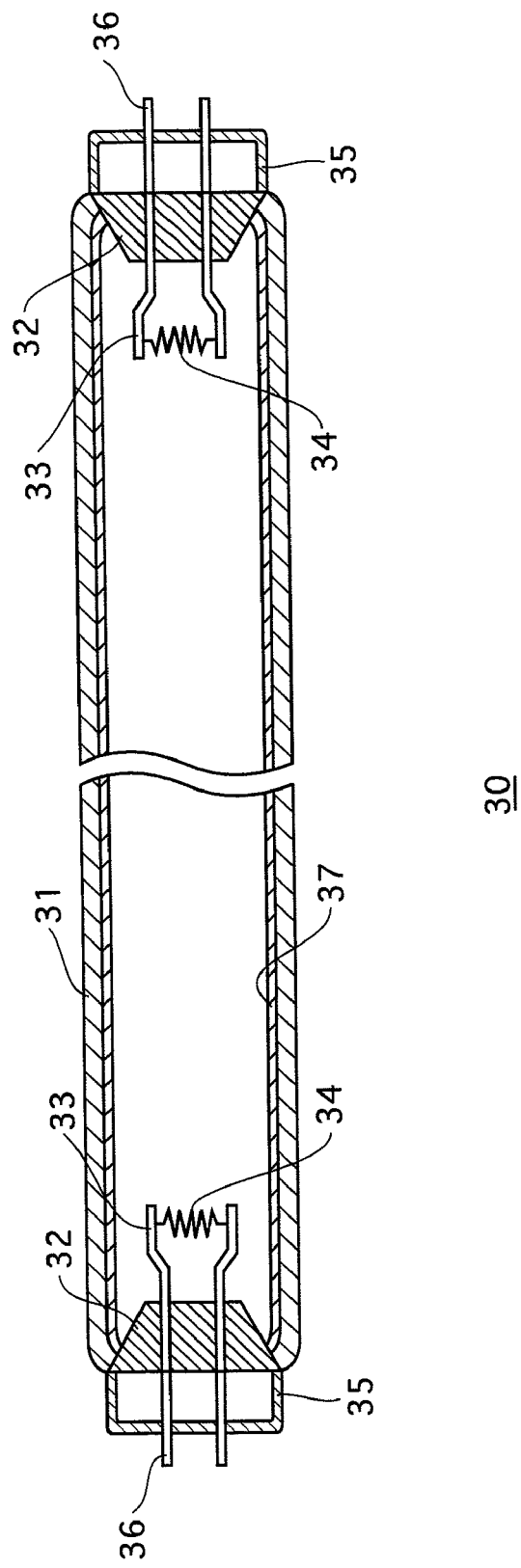
FIG. 6 is a schematic view showing a configuration of substantial parts of a fluorescent lamp in accordance with Embodiment 3 of the present invention.

Thirdly, a straight-tube-type fluorescent lamp is described as a lamp in accordance with Embodiment 3 of the present invention, with reference to the drawing. FIG. 6 is a cross-sectional view showing a configuration of substantial parts of the straight-glass-tube-typed fluorescent lamp in accordance with Embodiment 3 of the present invention.

A straight-tube-type fluorescent lamp 30 includes an arc tube 31. A pair of stems 32 is sealed airtight at each end of the arc tube 31. A pair of lead wires 33 is fixed airtight at the each stem 32. A pair of filament electrodes 34 is fixed at the both ends of the lead wire 33. An electron radiation substance is coated on a surface of each filament electrode 34. A base 35 is fixed at each end of the arc tube 31. A tube pin 36 is fixed at the base 35 so as to be in electric contact with the lead wire 33. A phosphor layer 37 is coated on the inner surface of the arc tube 31. A Specified amount of mercury and noble gas such as argon fill the arc tube 31.

(Description of Experimentation)

Samples of glass compositions shown in FIGS. 1 and 2 were prepared to evaluate properties of the glass. FIG. 1 shows the compositions and the properties of the glass in accordance with the embodiments of the present invention. FIG. 2 shows the compositions and the properties of the glass in accordance with the comparative examples.

The examples 1-17 shown in FIG. 1 are of glass in accordance with the embodiments of the present invention. The comparative examples 18-21 and 23-36 shown in FIG. 2 are of glass that is out of the composition range in accordance with the present invention. The comparative example 22 shown in FIG. 2 is of commercially available glass (PS-94, manufactured by Nippon Electric Glass, Inc.) whose electric volume resistivity ρ is $10^{8.5}$ Ω·cm and over at the temperature of 250° C. The comparative example 27 is of conventional soda-lime glass for lamps.

Evaluation glass samples were prepared through the following process. Raw materials of the respective glass samples were blended to fall within the composition range as shown in FIGS. 1 and 2. The blended raw materials were put into a platinum crucible, and melted through heating in an electric furnace. Later, the glass melt was formed into a block shape and a plate shape, and then annealed.

Thermal expansion coefficients ($\alpha_{30/380}$) of the samples were measured at the temperatures ranging between 30° and 380° C. inclusive with Thermo Mechanical Analysis Instrument (Thermo Plus, TMA8310, manufactured by Rigaku Corp.). The measurement was made on cylindroid-shaped glass samples with a diameter of 4 mm and a height of 12 mm having been processed from the block-shaped glass. The thermal expansion coefficients of the glass in the examples 1-17 range between $90 \times 10^{-7}$ and $104 \times 10^{-7}$/K inclusive as shown in FIG. 1, which are appropriate thermal expansion coefficients for lamps.

A softening point of each glass sample was measured according to JIS R3103-1 "Garasu no Nankaten Shiken Hoho (Method of Test for Softening Point of Glass)." A softening point is used as a criterion of glass workability. Glass with a low softening point is suitable for manufacturing a complicated-shaped lamp such as a circular-shaped or U-shaped lamp. In other words, glass with a low softening point ensures excellent glass workability.

Electric volume resistivity ρ at 250° C. was measured with Digital Insulation Measuring Instrument (DMS-8103, manufactured by To a Electronics LTD.)

A more specific description of the process for measuring the electric volume resistivity ρ is as follows. Each sample used in the experiment was prepared by processing the block-shaped glass into a cylindroid shape with a diameter of 25 mm and a height of 4 mm. Silver paste was coated on one surface of the glass so as to form an electrode plane with a diameter of 10 mm and also on the other surface of the glass to form another electrode plane with a diameter of 10 mm and longer. The whole sample glass was put into a furnace, and then the electric volume resistivity ρ was measured with use of a lead wire fixed at each of the electrode planes at a constant temperature of 250° C.

Transmittance of ultraviolet rays with a wavelength of 313 nm was measured with a spectral photometer. The measurement was made on plate-shaped glass sample with 2 mm wall thickness of which both of the surfaces having been mirror-polished. The $CeO_2+Ce_2O_3$ and $SnO+SnO_2$ content in the examples 1-17 are within the composition range of the present invention. Accordingly, compared with the comparative examples 22 and 27, the transmittances of ultraviolet rays in the examples 1-17 is less than half, showing higher ultraviolet screening capacity.

The comparative examples 18 and 23 having $CeO_2+Ce_2O_3$ content lower than 0.01 wt % did not show high ultraviolet screening capacity. On the contrary, the examples 1-17 having $CeO_2+Ce_2O_3$ content higher than 0.01 wt % showed high ultraviolet screening capacity.

For evaluating ultraviolet coloring, discolorment and deterioration of a resin component caused by ultraviolet ray transmission, a 32 watt compact fluorescent lamp (FHT32EX-N) and a 27 watt compact fluorescent lamp (FPL27EX-N) were produced with use of the glass. More specifically, in the examples 1-8 and the comparative examples 18-22, a prototype of a 32 watt compact fluorescent lamp (FHT32EX-N) was produced with use of the glass whose electric volume resistivity ρ is $10^{8.5}$ Ω·cm and more at 250° C. In the examples 9-17 and the comparative examples 23-27, a prototype of a 27 watt compact fluorescent lamp (FPL27EX-N) was produced with use of the glass having electric volume resistivity ρ below $10^{8.5}$ Ω·cm at 250° C.

Evaluation results of discolorment and deterioration of the resin component are described with the marks in the columns of the tables as follows: "○" for no discolorment and/or deterioration; "Δ" for a little discolorment and/or deterioration with an unproblematic degree; "x" for serious discolorment and/or deterioration with a problematic degree. The evaluation results of initial and ultraviolet coloring are described with the marks in the columns of the tables as follows: "○" for no coloring; and "x" for coloring.

The examples 1-17 show no initial coloring, and also none of ultraviolet coloring, discolorment or deterioration of the resin component after 2000-hour lighting. The comparative examples 21 and 26 show high ultraviolet screening capacity because of coexistence of $CeO_2$ and $SnO_2$. However, initial coloring and ultraviolet coloring are observed because the $CeO_2+Ce_2O_3$ and $SnO+SnO_2$ contents are out of the composition range of the present invention. The comparative examples 19, 20, 24 and 25 show high ultraviolet screening capacity because of the $CeO_2+Ce_2O_3$ content of 0.01 wt % and more. However, ultraviolet coloring is observed because of no SnO content.

The comparative examples 22 and 27 show no glass coloring. However, discolorment and deterioration of the resin component are observed due to high transmittance of ultraviolet rays.

In order to determine a luminous flux and lumen maintenance factor of each of the lamps, luminous fluxes after 100-hour lighting and after 2000-hour lighting were measured. In the examples 1-8, the luminous fluxes of the lamps after 100-hour lighting and after 2000-hour lighting are the same or higher than that in the comparative example 22. In the examples 9-17, the luminous fluxes after 100-hour lighting and after 2000-hour lighting are the same or higher than that in the comparative example 27. In the examples 18-20, however, the luminous fluxes after 100-hour lighting and after 2000-hour lighting are lower than that in the comparative example 22, which indicates deterioration of the lamp performance. In the comparative example 21, the luminous flux of the lamp after 100-hour lighting is higher than that in the comparative example 22 because the glass containing $SnO+SnO_2$ ensures white-light emission. However, there is a large decrease observed in the luminous flux after 2000-hour lighting due to ultraviolet coloring. In the comparative examples 23-26, the luminous fluxes after 100-hour lighting and after 2000-hour lighting are lower than that in the comparative example 27, which indicates deterioration in the lamp performance. In the comparative example 26, the luminous flux after 100-hour lighting is higher than that in the comparative example 27 because of the $SnO+SnO_2$ content that leads to white-light emission. However, the luminous flux after 2000-hour lighting largely decreased due to ultraviolet coloring. Note that the examples 9-17 show the higher luminous fluxes of the lamp than those in the examples 1-8, thanks to the higher $SnO+SnO_2$ content that brings about white-light emission.

The lumen maintenance factors in the examples 1-8 after 2000-hour lighting is almost equal to that in the comparative example 22, as no glass coloring occurred in the examples 1-8. The lumen maintenance factors in the examples 9-17 after 2000-hour lighting are also equal to that in the comparative example 27, as no glass coloring occurred in the examples 9-17 either. The comparative examples 19-21, however, show deterioration in the lamp performance, as the lumen maintenance factors of the comparative examples 19-21 after 2000-hour lighting are lower than that in the comparative example 22. The comparative examples 24-26 also show deterioration of the lamp performance, as the lumen maintenance factors of the comparative examples 24-26 after 2000-hour lighting are lower than that in the comparative example 27.

Note that each of the lamps showed no defect such as a defective seal.

Figure 7:
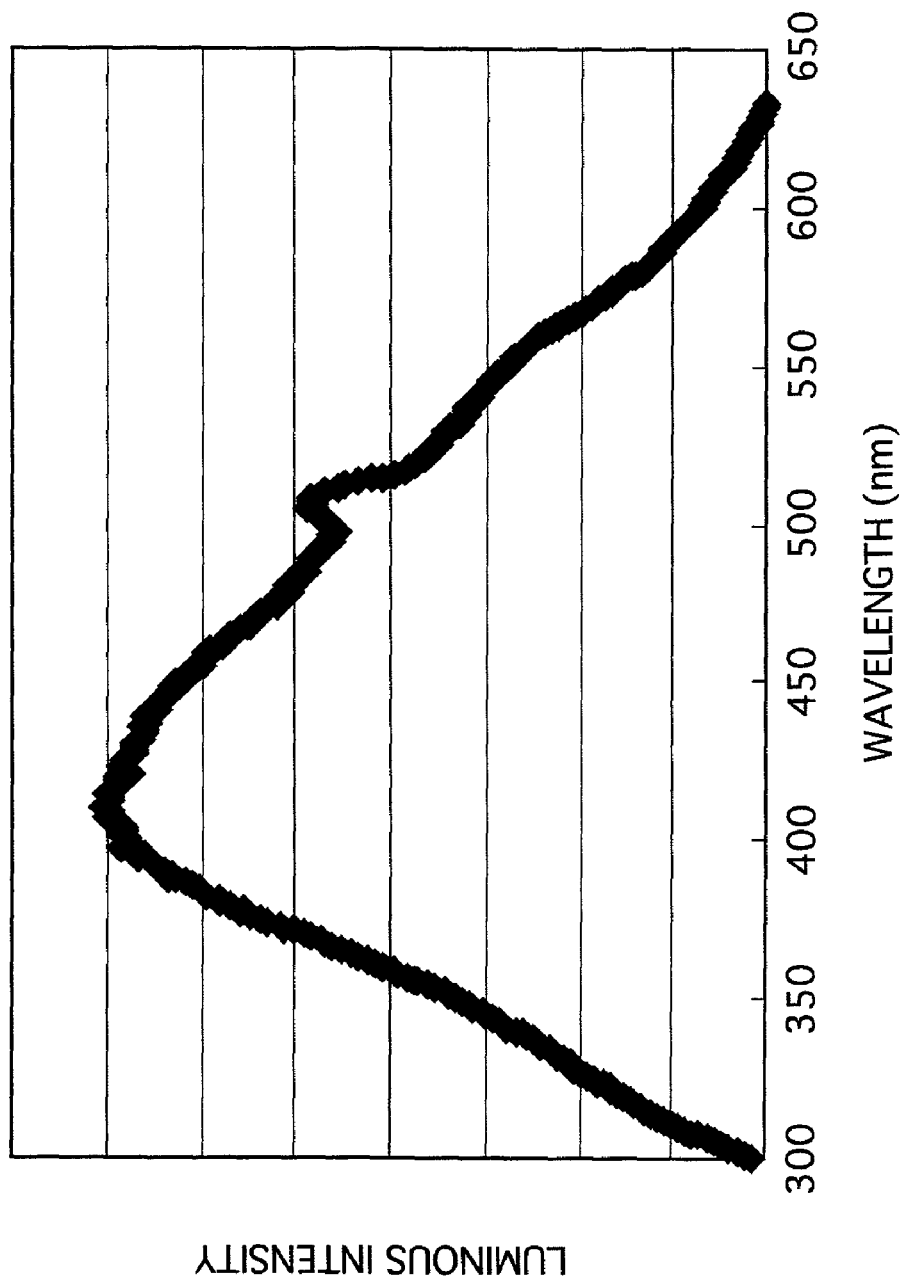
FIG. 7 is a graph showing an emission spectrum of the glass compositions in accordance with an embodiment of the present invention.

FIG. 7 shows luminous properties of the glass of the present invention. In order to evaluate the luminous properties, emission spectrum of ultraviolet radiation with a wavelength of 254 nm was measured with use of a spectral photometer. The measurement was made on plate-shaped glass sample with wall thickness of 2 mm of which both of the surfaces having mirror-polished.

The following description relates to the glass properties evaluated with use of the glass sample composed within the range of the composition shown in FIG. 3.

The examples 31-34 shown in FIG. 3 is of glass composed within the composition range in accordance with the present invention. The comparative examples 35-37 shown in FIG. 3 is of glass whose compositions being out of the composition range of the present invention. The comparative example 38 is of conventional soda-lime glass. As shown in FIG. 3, thermal expansion coefficients of the glass at the temperatures between 30° and 380° C. inclusive are within the range of $90 \times 10^{-7}$-$104 \times 10^{-7}$/K. The result indicates that the glass may be applied for an arc tube for a fluorescent lamp.

Transmittances of 200-1200 nm wavelength light were measured with the spectral photometer. The measurement was made on plate-shaped glass with 2 mm wall thickness of which both of the surfaces having been mirror-polished. The measurement results are shown in FIGS. 8 and 9.

Figure 8:
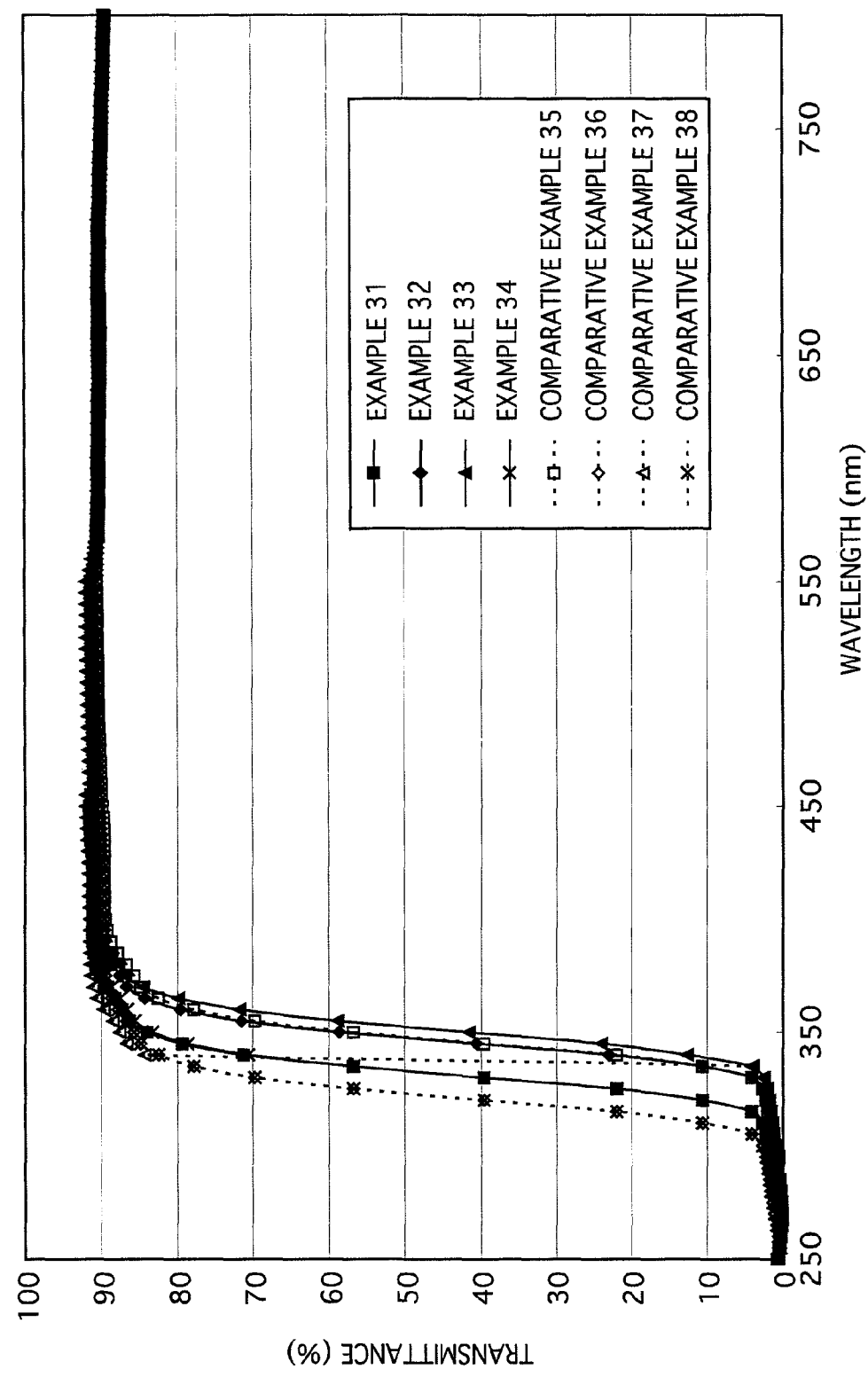
FIG. 8 is a graph showing spectral transmittance of the glass compositions in accordance with the examples and the comparative examples of the present invention.
Figure 9:
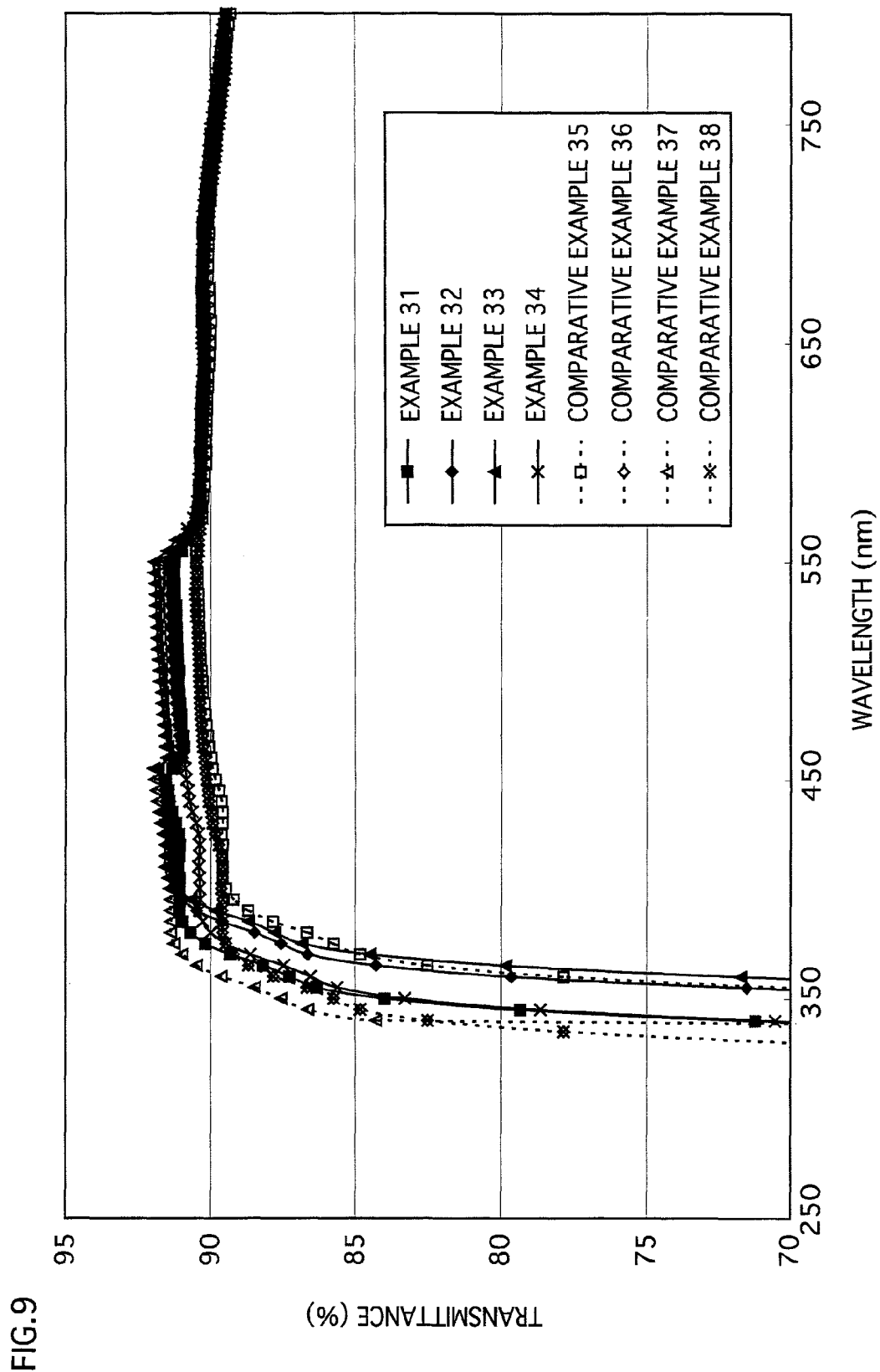
FIG. 9 is a graph showing spectral transmittance of the glass compositions in accordance with the examples and the comparative examples of the present invention.

As shown in FIG. 8, the transmittances in the examples 31-34 are lower than that in the conventional soda-lime glass (the comparative example 38), since the $CeO_2+Ce_2O_3$ and $Fe_2O_3+FeO$ content in the examples 31-34 are within the composition range. In addition, as the ratios of trivalent ferric ions ($Fe^{3+}$) to all iron ions are kept under 0.5, the 380-550 nm visible light transmittances in the examples 31-34 are higher than that in the conventional soda-lime glass.

The transmittance in the comparative example 35 is lower than that in the conventional soda-lime glass, since the $CeO_2+Ce_2O_3$ and $Fe_2O_3+FeO$ content are within the composition range of the present invention. However, as the ratio of trivalent ferric ions ($Fe^{3+}$) to all iron ions is kept 0.5 and over, the 380-550 nm visible light transmittance in the example 35 is nearly equal to that in the conventional soda-lime glass.

The transmittance in the comparative example 36 is higher than that in the conventional soda-lime glass, since the $CeO_2+Ce_2O_3$ and $Fe_2O_3+FeO$ contents are low. In addition, since the ratio of trivalent ferric ions ($Fe^{3+}$) to all iron ions is 0.5 and over, the 380-550 nm visible light transmittance in the comparative example 36 is nearly equal to that in the conventional soda-lime glass.

The transmittance in the comparative example 37 is lower than that in the conventional soda-lime glass, since the $CeO_2+Ce_2O_3$ and $Fe_2O_3+FeO$ contents are within the composition range of the present invention. Besides, since the ratio of trivalent ferric ions ($Fe^{3+}$) to all iron ions is kept under 0.05, the 380-550 nm visible light transmittance in the comparative example 37 is higher than that in the conventional soda-lime glass.

A degree of ultraviolet coloring of each of the glass was evaluated with use of the abovementioned method. A prototype of a 32 watt compact fluorescent lamp (FHT32EX-N) was produced with use of the glass. Discolorment and deterioration of the resin component, as well as a luminous flux and a lumen maintenance factor were evaluated with use of the above-mentioned method.

The examples 31-33 show none of ultraviolet coloring of glass, discolorment or deterioration of the resin component. The examples 31-33 also show high luminous fluxes after 100-hour lighting (hereinafter called "initial luminous flux") and also high lumen maintenance factors.

The example 34 shows no ultraviolet coloring, however, shows a little discolorment and deterioration of the resin component with an unproblematic degree due to the following reason. The $CeO_2+Ce_2O_3$ and $Fe_2O_3+FeO$ contents are rather low with $CeO_2+Ce_2O_3$: 0.05 wt % and $Fe_2O_3+FeO$: 0.04 wt %, in spite of the content being within the composition range of the present invention.

The comparative example 35 shows none of ultraviolet coloring, discolorment nor deterioration of the resin component. However, initial luminous flux is lower than that of the conventional soda-lime glass (the comparative example 38) due to the low transmittance of visible light.

The comparative example 36 shows no ultraviolet coloring. However, discolorment and deterioration of the resin component are a little observed because of the high transmittance of ultraviolet rays. In addition, the initial luminous flux is lower than that of the conventional soda-lime glass due to the low transmittance of visible light.

The comparative example 37 shows neither discolorment nor deterioration of the resin component, and the initial luminous flux is nearly equal to that of the conventional soda-lime glass. However, the comparative example 37 shows ultraviolet coloring because the $SnO+SnO_2$ content is extremely low compared with the $CeO_2+Ce_2O_3$ content. However, note that the glass composition of the comparative example 37 is within the composition range of the present invention. Therefore to add a reducing agent to the glass composition results in suppression of ultraviolet coloring. The comparative example 37 in which ultraviolet coloring occurred is introduced because such a reducing agent was not used in the experiment.

INDUSTRIAL APPLICABILITY

A glass composition for lamps, a glass part for lamps, and a lamp of the present invention are extensively applicable to general lamps, such as a compact fluorescent lamp, a circular-typed fluorescent lamp, and a straight-tube-typed florescent lamp, and other lamps such as a mercury vapor discharge lamp.

Furthermore, the glass composition for lamps, the glass part for lamps, and the lamp of the present invention substantially are free of any environmental-load substance such as lead and $Sb_2O_3$. Thus, the present invention is effective in meeting social needs of global environmental protection.

The invention claimed is:

1. A glass composition for lamps, substantially comprising the following that are expressed in terms of oxides:
$SiO_2$:60-75 wt %;
$CeO_2+Ce_2O_3$:0.08-0.3 wt %;
$SnO+SnO_2$:0.01-5.2 wt %;
$Al_2O_3$:0.5-6 wt %;
$B_2O_3$:0-5 wt %;
$Li_2O+Na_2O+K_2O$:13-20 wt %;
MgO:0.5-5 wt %;
CaO:1-10 wt %;
SrO:0-10 wt %;
BaO:0-10 wt %;
ZnO:0-10 wt %;

$Fe_2O_3+FeO$: 0.04-0.1 wt %; and
$TiO_2$: 0-1 wt %.

2. The glass composition of claim 1 emitting white light when exposed to ultraviolet radiation with a wavelength of 254 nm.

3. The glass composition of claim 1, wherein
a weight percent of the $CeO_2+Ce_2O_3$ is lower than a weight percent of the $SnO+SnO_2$.

4. The glass composition of claim 1, wherein
a thermal expansion coefficient at temperatures between 30° and 380° C. inclusive ranges between $90\times10^{-7}$ and $104\times10^{-7/K}$ inclusive.

5. A glass part for lamps comprising the glass composition of claim 1.

6. A lamp comprising the glass part of claim 5.

7. A process for producing a glass composition for lamps, comprising;
preparing glass materials substantially containing the following that are expressed in terms of oxides:
$SiO_2$: 60-75 wt %;
$CeO_2+Ce_2O_3$: 0.08-0.3 wt %;
$SnO+SnO_2$: 0.01-5.2 wt %;
$Al_2O_3$: 0.5-6 wt %;
$B_2O_3$: 0-5 wt %;
$Li_2O+Na_2O+K_2O$: 13-20 wt %;
$MgO$: 0.5-5 wt %;
$CaO$: 1-10 wt %;
$SrO$: 0-10 wt %;
$BaO$: 0-10 wt %;
$ZnO$: 0-10 wt %;
$F_2O_3+FeO$: 0.04-0.1 wt %; and
$TiO_2$: 0-1 wt %; and;
melting the glass materials, wherein
the glass materials in a molten state are made to have reductive properties.

8. The process for producing the glass composition of claim 7, wherein
the weight percent of the $CeO_2+Ce_2O_3$ is lower than the weight percent of the $SnO+SnO_2$.

* * * * *